(12) United States Patent
Pimpinella et al.

(10) Patent No.: US 12,366,703 B2
(45) Date of Patent: Jul. 22, 2025

(54) MULTIMODE FIBER HAVING IMPROVED INDEX PROFILE

(71) Applicant: Panduit Corp., Tinley Park, IL (US)

(72) Inventors: Richard J. Pimpinella, Frankfort, IL (US); Gaston E. Tudury, Mission Viejo, CA (US)

(73) Assignee: Panduit Corp., Tinley Park, IL (US)

( * ) Notice: Subject to any disclaimer, the term of this patent is extended or adjusted under 35 U.S.C. 154(b) by 555 days.

(21) Appl. No.: 17/519,829

(22) Filed: Nov. 5, 2021

(65) Prior Publication Data

US 2022/0057571 A1     Feb. 24, 2022

Related U.S. Application Data

(63) Continuation of application No. 17/010,213, filed on Nov. 16, 2020, now abandoned, which is a continuation of application No. 12/627,752, filed on Nov. 30, 2009, now abandoned.

(60) Provisional application No. 61/118,903, filed on Dec. 1, 2008.

(51) Int. Cl.
    *G02B 6/028*     (2006.01)

(52) U.S. Cl.
    CPC ................... *G02B 6/0288* (2013.01)

(58) Field of Classification Search
    CPC ........................................... G02B 6/0288
    See application file for complete search history.

(56) References Cited

U.S. PATENT DOCUMENTS

| | | | |
|---|---|---|---|
| 3,823,997 A | 7/1974 | Gloge et al. | |
| 3,843,228 A | 10/1974 | Yoshiyagawa et al. | |
| 4,067,642 A | 1/1978 | King et al. | |
| 4,204,745 A | 5/1980 | Sakai et al. | |
| 4,217,027 A | 8/1980 | MacChesney et al. | |
| 4,298,365 A | 11/1981 | Bailey et al. | |
| 4,339,174 A | 7/1982 | Levin | |
| 4,473,273 A * | 9/1984 | Hodge | C03B 37/02745 |
| | | | 385/124 |
| 4,793,843 A | 12/1988 | Pluijms et al. | |
| 5,729,645 A | 3/1998 | Garito et al. | |
| 6,078,715 A | 6/2000 | Fujii et al. | |
| 6,292,612 B1 | 9/2001 | Golowich et al. | |
| 6,400,450 B1 | 6/2002 | Golowich et al. | |
| 6,490,396 B1 | 12/2002 | Smith | |

(Continued)

FOREIGN PATENT DOCUMENTS

| | | |
|---|---|---|
| EP | 2144096 A1 | 1/2010 |
| JP | 042901 | 4/1983 |

(Continued)

*Primary Examiner* — Chad H Smith

(74) *Attorney, Agent, or Firm* — Christopher K. Marlow; Christopher S. Clancy; James H. Williams

(57) ABSTRACT

A graded index multimode fiber and method of producing the graded index multimode fiber utilize a technique of reducing an index profile of the core of the multimode fiber below a standard parabolic index profile. This can be done by changing dopant concentrations in the fiber core over the radius of the fiber core. The result is a multimode fiber having differential mode delay characteristics that are intentionally not minimized. The index profile can be reduced below the standard parabolic index profile over the entire radius of the core, or only for radii above a specified radius.

3 Claims, 3 Drawing Sheets

(56) References Cited

U.S. PATENT DOCUMENTS

| | | |
|---|---|---|
| 6,510,265 B1 | 1/2003 | Giaretta et al. |
| 6,574,403 B1 | 6/2003 | Golowich et al. |
| 6,579,018 B1 | 6/2003 | Li et al. |
| 6,597,848 B1 | 7/2003 | Berkey et al. |
| 6,718,800 B2 | 4/2004 | Mazzarese et al. |
| 6,772,611 B2 | 8/2004 | Kliner et al. |
| 6,807,350 B2 | 10/2004 | Soufiane et al. |
| 6,882,787 B2 | 4/2005 | Srikant |
| 6,990,277 B2 | 1/2006 | White |
| 7,043,126 B2 | 5/2006 | Guan et al. |
| 7,095,940 B2 | 8/2006 | Hayami et al. |
| 7,116,877 B2 | 10/2006 | Kuijpers et al. |
| 7,646,955 B2 | 1/2010 | Donlagic |
| 7,995,888 B2 | 8/2011 | Gholami et al. |
| 2001/0031121 A1* | 10/2001 | Kim ............... G02B 6/0288 385/124 |
| 2004/0202423 A1 | 10/2004 | White |
| 2005/0053351 A1 | 3/2005 | Guan et al. |
| 2005/0157995 A1* | 7/2005 | Guan ............... H04J 14/02 385/123 |
| 2006/0034573 A1* | 2/2006 | Guan ............... G02B 6/268 385/28 |
| 2010/0028020 A1 | 2/2010 | Gholami et al. |
| 2010/0142969 A1 | 6/2010 | Gholami et al. |
| 2010/0171945 A1 | 7/2010 | Gholami et al. |

FOREIGN PATENT DOCUMENTS

| | | |
|---|---|---|
| JP | 2005037608 A | 2/2005 |
| JP | 2005089211 A | 4/2005 |
| WO | 2009054715 A1 | 4/2009 |

* cited by examiner

MULTIMODE FIBER HAVING IMPROVED INDEX PROFILE

CROSS REFERENCE TO RELATED APPLICATION

This application is a continuation of U.S. patent application Ser. No. 17/010,213, filed Nov. 16, 2020, which is a continuation of U.S. patent application Ser. No. 12/627,752, filed Nov. 30, 2009, which claims priority to U.S. Provisional Application Ser. No. 61/118,903, filed on Dec. 1, 2008, the entirety of which is hereby incorporated by reference.

FIELD OF THE INVENTION

The present invention is generally directed to optical fibers for use in communications and more specifically directed to a multimode optical fiber having an improved index-of-refraction profile.

BACKGROUND OF THE INVENTION

In modern fiber optic communication systems, light signals are guided along cylindrical waveguides, which take the form of thin fibers. Optical fibers are comprised of an inner core region surrounded by an outer cladding region, where the optical density of the core, measured in terms of refractive index $n_1$, is higher than the refractive index $n_2$ of the cladding, FIG. 1. The refractive index of the optical media can be adjusted by introducing impurities (or dopants) during the manufacturing process. For glass optical fibers germanium is typically used to increase the refractive index of the core, but other impurities can be used or added.

Due to this difference in refractive index, light pulses traveling within the core of the fiber undergo total internal reflection each time they strike the core-cladding interface and as a result, the light signal is confined or guided within the core. This type of optical fiber, which has a uniform core refractive index is called step-index fiber (SI-fiber). To facilitate high-speed data communications, the core diameter of SI-fiber is typically small (on the order of 9 microns), which is only several times larger the wavelength of the transmitted light and consequently, an optical signal is constrained to travel in a single path along the fiber axis. This type of fiber is called single-mode fiber.

Alternatively, the core diameter of the optical fiber can be large in comparison to the wavelength of light, in which case light can traverse the core along many discrete optical paths, where each optical path is called a mode. This type of fiber is referred to as multimode fiber (MMF) and has a nominal core diameter of 50 or 62.5 microns. Typically, in MMF a pulse of light impinging on the input end of the fiber illuminates a relatively large spatial area of the core so that the optical pulse propagates as the sum of many discrete optical modes. Due to differences in path length between modes, portions of the optical pulse energy will arrive at the output end of the fiber at different times. As a result, the width of the pulse broadens, referred to as inter-modal dispersion. This degrades signal quality. To reduce inter-modal dispersion, the refractive index of the MMF core and cladding is graded such that the refractive index decreases continuously with radial distance r from the core axis according to the equation, $$n_0^2(r) = \begin{cases} n_{1_0}^2 \left[1 - 2\left(\frac{r}{R}\right)^\alpha \Delta_0\right], & r < R \\ n_{1_0}^2(1 - 2\Delta_0) = n_2^2, & r \geq R \end{cases}$$

Where, $$\Delta_0 = \frac{n_{1_0}^2 - n_2^2}{2n_{1_0}^2}$$

The fiber parameter a has a value close to two (typically 1.9-2.1), and defines the shape of the refractive index profile, shown in FIG. 2 for α=2. An ideal parabolic (or power law) refractive index profile of a core with a radius $R_{ideal}$ will cause each of the modes traversing a graded-index MMF to arrive at the output end of the fiber at the same time. Low order modes traveling close to the fiber axis encounter a high refractive index, i.e., a more optically dense medium, and will therefore propagate at a reduced speed. Higher order modes propagating in the outer regions of the core will encounter lower refractive index (less dense medium) and will propagate faster.

FIG. 3 illustrates the modes propagating in a MMF having an ideal parabolic refractive index profile. Each of the modes traverses a sinusoidal path and all modes arrive at the output end of the fiber at the same time. We see that the nodes of each of the modes are in phase.

The quality of the refractive index profile of a MMF can be characterized using a standard test procedure specified in TIA-455-220-A. This standard specifies the test method for measuring differential mode delay (DMD), which quantifies the inter-modal dispersion. In this method, a single-mode launch fiber is stepped across the core of a MMF and the propagation delay of each excited set of modes traversing the fiber is recorded. A plot of the DMD for a high-performance MMF is shown in FIG. 4.

The plot shows the recorded optical waveforms for each of the excited sets of modes at the output of the fiber in picoseconds per meter (ps/m) as a function of radial launch position in microns on the vertical axis. For this representative MMF we see that each of the excited sets of modes arrives at the output of the fiber at about the same time irrespective the optical launch radial position and therefore, this fiber introduces little inter-modal dispersion. From the DMD plot one can deduce that the refractive index profile for this fiber is near the ideal parabolic profile.

However in practice, due to difficulties in controlling low dopant concentrations during the manufacturing process, most MMF's do not exhibit ideal parabolic refractive index profiles. In particular, dopant concentrations in the outer regions of the core where the concentrations are smallest are most challenging to control. As a result, higher order modes often exhibit variations in mode delay in comparison to those modes propagating along the inner regions of the core. It is therefore desirable to modify the refractive index profile in such a way as to reduce the adverse affect caused by variations in low level flow control of dopant.

SUMMARY OF THE INVENTION

An important factor that affects the performance of an optical channel link is the amount of total dispersion in the fiber. To improve the performance of MMF, a modification to the manufacturing process is proposed that alters the index profile to values below the refractive index that would normally be seen with a traditionally ideal parabolic a value.

We describe a modification to the refractive index profile that has been shown to improve measured system performance.

DETAILED DESCRIPTION OF THE INVENTION

The number of modes N, supported by the MMF is given by, $$N_0 = \frac{\alpha}{\alpha+2} n_{1_0}^2 k_0^2 R^2 \Delta_0$$

Figure 5:
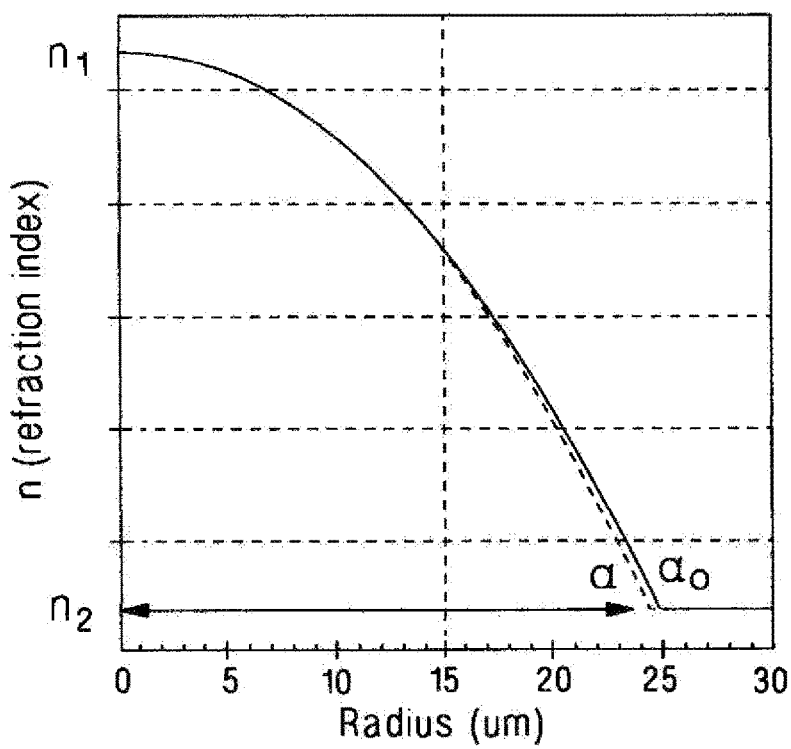
FIG. 5 is a graph showing the index of refraction versus radius in the core of a multimode fiber both according to the prior art ($\alpha_0$) and according to the present invention ($\alpha$)

Where, $k_0 = 2\pi/\lambda_0$, is the wave number for light having wavelength $\lambda_0$ in free space. By changing the targeted value of the refractive index profile whereby it decreases to a lower than ideal parabolic value at increasing radial distance in the core, improved fiber performance is achieved. According to one embodiment, the value of the refractive index profile is decreased below an ideal parabolic index profile. According to a preferred embodiment, the refractive index profile is decreased continuously and monotonically. In some embodiments, the target refractive index profile is altered above a specific core radius $r_t$. For example, in one embodiment, the target refractive index profile is altered for core radii greater than 5 μm such that the refractive index profile is smaller than the profile following a power law function (as shown in FIG. 5). In another embodiment, the target refractive index profile is altered for core radii greater than 1 μm.

Figure 1:
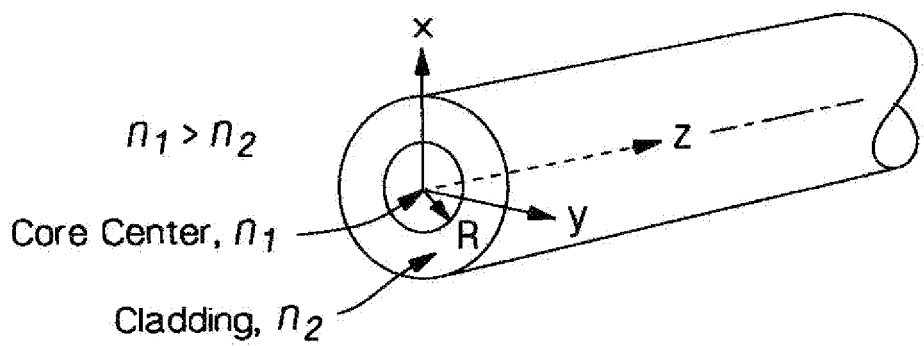
FIG. 1 is a cutaway perspective view of an optical fiber.
Figure 2:
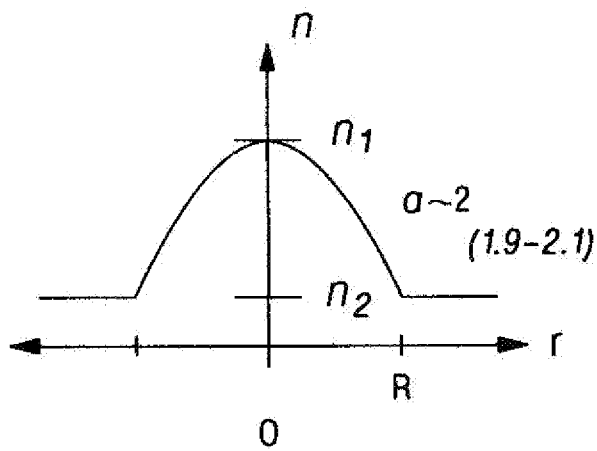
FIG. 2 is a graph showing the index of refraction versus radius in the core and cladding of a graded-index multimode fiber.
Figure 3:
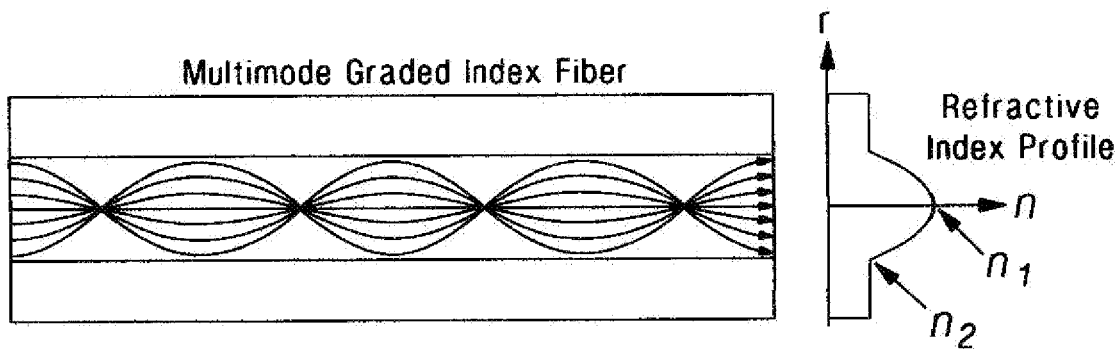
FIG. 3 is a diagram showing mode behavior in a graded-index multimode fiber.
Figure 4:
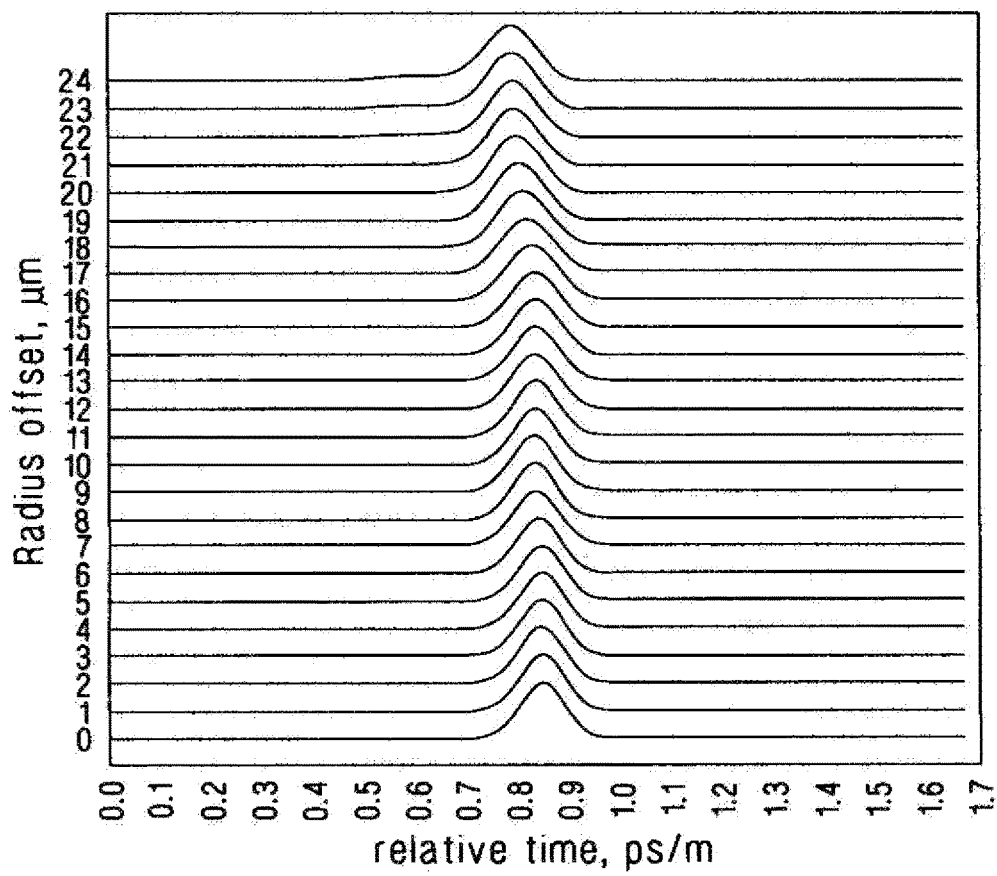
FIG. 4 is a differential mode delay diagram showing the relative time of pulse arrival as compared to the radius offset in a multimode fiber.

According to one embodiment of the present invention, a technique is used to decrease the "target" value of the refractive index profile by controlling dopant concentrations to result in a decreased refractive index below what would traditionally result from a standard parabolic-type distribution. It has been discovered that, in cases where a traditional ideal parabola is the target, a certain relatively small amount of the resulting fiber will fall near the target, producing a desirable DMD plot as shown in FIG. 4.

However, due to the difficulty of controlling low concentrations of dopant, the index profile of a certain amount of the produced fiber will fall below the target profile, and some of the fiber will have an index profile that falls above the target profile. Fibers that have index profiles in regions higher than the target parabolic profile (which would be characterized by a "shift to the right" with increasing radius in the plot of FIG. 6) have poor System Bit Error Rate (BER) performance.

Figure 6:
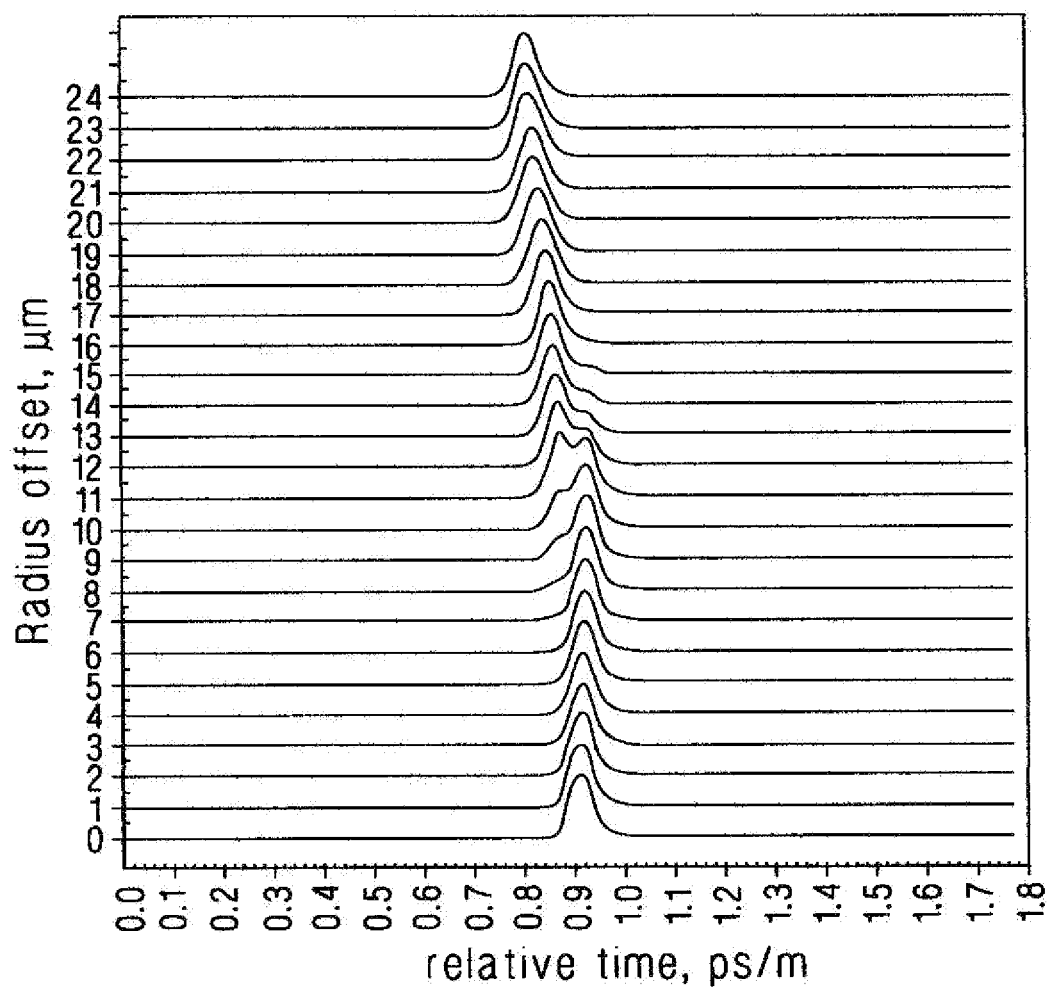
FIG. 6 is a differential mode delay diagram showing the differential mode delay characteristics of a multimode fiber having an index profile modified according to the present invention.

A fiber that has a modified refractive index profile as proposed will exhibit a DMD trace essentially similar to that shown in FIG. 6. As the radius increases beyond 8 microns in FIG. 6, there is a lateral displacement of the waveform peaks that shift continuously and monotonically towards the left side of the graph. In this case higher-order modes are traveling faster since a shift to the left corresponds to smaller values in units of ps/m.

In FIG. 5, we plot two refractive index profiles, $\alpha_0=2$, and the proposed modified profile shown by the dashed line. Here we use $\alpha_0=2$ as an example, but obviously this modification applies equally to values of $\alpha$ other than 2. The solid curve represents the variation of the refractive index that follows the equation of $n_0(r)$ described above. The proposed modified refractive index profile (dashed line) does not follow that equation, and instead follows a different equation (for example denoted as $n_{mod}(r)$). A fiber that follows the $n_0(r)$ described by the formula will have a DMD trace similar to that shown in FIG. 4.

Such a modification to the refractive index will affect the supported number of modes N. If the fiber follows a power law, $$n_0^2(r) = n_{1_0}^2 \left[1 - 2\left(\frac{r}{R}\right)^\alpha \Delta_0\right] \text{ for } r < R$$

With $\Delta_0$ defined as $$\Delta_0 = \frac{n_{1_0}^2 - n_2^2}{2n_{1_0}^2}$$

The supported number of modes is $$N_0 = \frac{\alpha}{\alpha+2} n_{1_0}^2 k_0^2 R^2 \Delta_0$$

Assuming that $n_1$ has a weak radial dependence, we could write $n_1$ as $$n_1^2(r) = n_{1_0}^2 + \varepsilon(r)$$

In this case $\Delta$ becomes $$\Delta = \frac{n_{1_0}^2 + \varepsilon(r) - n_2^2}{2[n_{1_0}^2 + \varepsilon(r)]}$$

Neglecting the $\varepsilon(r)$ in the denominator, $\Delta$ becomes $\Delta(r) = \Delta_0 + \varepsilon(r)$.

Replacing $\Delta(r)$ and $n_1(r)$ in the equation for N, we get $$N = \frac{\alpha}{\alpha+2} \{[n_{1_0}^2 + \varepsilon(r)]k_0^2 R^2\}[\Delta_0 + \varepsilon(r)]$$

This results in four terms. The term that is proportional to $\varepsilon^2(r)$ can be neglected. The same for the term proportional to $\varepsilon(r) \cdot \Delta_0$, since $\varepsilon$ and $\Delta_0$ are much smaller than n.

The two remaining terms yield $$N = \frac{\alpha}{\alpha+2} k_0^2 R^2 n_{1_0}^2 [\Delta_0 + \varepsilon(r)] = N_0 \left[1 + \frac{\varepsilon(r)}{\Delta_0}\right]$$

For a variation of $\varepsilon(r)$ on the order of a tenth of $\lambda_0$, and where $\varepsilon(r)$ is a negative quantity, the number of supported modes is reduced by $N=N_0 \times 0.9$. Or in this case the number of modes, N, is reduced by 10%. Although higher-order modes travel faster increasing inter-modal dispersion the modification to the index profile according to some embodiments of the present invention will also result in higher system performance.

System measurements for fibers having a refractive index profile exhibiting a DMD plot where the pulse waveforms shift to the left at large radial offsets, as shown in FIG. 6, have shown improved fiber performance as compared to the known technique of attempting to have the refractive index profile match a parabolic target. This target can be achieved by decreasing the a value for portions of the core falling within a certain range of radii, or with radii falling above a certain number.

It has been found that altering the method of production of a multimode fiber as described herein, as compared to fibers having a "greater than parabolic" refractive index profile, results in produced fibers having a more desirable BER performance. According to some measurements, multimode fibers made with target refractive index profiles having a "lower-going" profile within a radius range of the core, as shown in FIG. 5, can have BER performance of up to 1000× better than multimode fibers manufactured with a "higher-going" profile within the same radius range.

System measurements for fibers having a refractive index profile exhibiting a DMD plot where the pulse waveforms shift to the left at large radial offsets, as shown in FIG. 6, have shown improved fiber performance as compared to the known technique of attempting to have the refractive index profile match a parabolic target. This target can be achieved by decreasing the a value (where $\alpha=\beta$) for portions of the core falling within a certain range of radii, or with radii falling above a certain number.

The invention claimed is:

1. A method of manufacturing a multimode optical fiber having a core with an index profile resulting in a radius dependent graded index of refraction, the method comprising: having a target index of refraction from a center of the core to a first radial distance, denoted as r, follow an optimum index profile and then reducing the target index of refraction for a portion of the core with a radial distance greater than r such that the target index profile of the fiber core for that portion is reduced below the optimum index profile, where the optimum index profile is designed to minimize modal dispersion at a spectral range of operation and further wherein a difference between the optimum index profile and the target index profile increases as the radial distance from the center of the core increases for the portion of the core for which the target index profile is lower than the optimum index profile.

2. The method of claim 1, wherein the target index profile is reduced below the optimum index profile for core radii greater than 5 μm.

3. The method of claim 1, wherein the target index profile is reduced below the optimum index profile for core radii greater than 1 μm.

* * * * *